(12) United States Patent
Weber et al.

(10) Patent No.: US 8,172,247 B2
(45) Date of Patent: May 8, 2012

(54) BICYCLE AERO HANDLEBAR ASSEMBLY

(75) Inventors: Jennifer Weber, Madison, WI (US); Douglas A. Cusack, Cottage Grove, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 13/175,310

(22) Filed: Jul. 1, 2011

(65) Prior Publication Data

US 2012/0001402 A1 Jan. 5, 2012

Related U.S. Application Data

(60) Provisional application No. 61/361,004, filed on Jul. 2, 2010.

(51) Int. Cl.
*B62J 9/00* (2006.01)
(52) U.S. Cl. ............... 280/288.4; 280/278; 74/551.8
(58) Field of Classification Search ............ 280/278, 280/279, 287, 288.4; 74/551.8, 551.1, 551.3, 74/551.9
See application file for complete search history.

(56) References Cited

U.S. PATENT DOCUMENTS

| | | | |
|---|---|---|---|
| 2,004,089 A | 6/1935 | Anderson | |
| 5,154,094 A | 10/1992 | Klieber | |
| 5,154,095 A | 10/1992 | Giard, Jr. | |
| 5,163,339 A | 11/1992 | Giard, Jr. | |
| D334,164 S | 3/1993 | Klieber | |
| 5,235,872 A | 8/1993 | Giard, Jr. | |
| 5,782,139 A | 7/1998 | Framan | |
| 6,092,438 A | 7/2000 | Soto | |
| 6,928,897 B2 | 8/2005 | Duncan | |
| 7,077,029 B2 | 7/2006 | McColligan et al. | |
| 7,127,966 B2 | 10/2006 | Meng | |
| 7,207,237 B2 | 4/2007 | Johnson | |
| 7,213,485 B2 | 5/2007 | Huang | |
| 7,490,531 B2 * | 2/2009 | Chen | 74/551.8 |
| 7,571,920 B2 | 8/2009 | Lane | |
| 7,698,967 B2 | 4/2010 | Ording et al. | |
| 2003/0084746 A1 | 5/2003 | Cutsforth | |
| 2003/0150292 A1 | 8/2003 | Duncan | |
| 2005/0044981 A1 * | 3/2005 | Huang | 74/551.8 |
| 2005/0109151 A1 | 5/2005 | Chiang et al. | |
| 2005/0132839 A1 | 6/2005 | Chen | |
| 2007/0039409 A1 * | 2/2007 | Meng | 74/551.8 |
| 2007/0151403 A1 * | 7/2007 | Andrews et al. | 74/551.1 |
| 2007/0175292 A1 | 8/2007 | Nicol | |
| 2007/0245849 A1 | 10/2007 | Chen | |

(Continued)

FOREIGN PATENT DOCUMENTS

EP 1886911 A2 2/2008

(Continued)

*Primary Examiner* — Tashiana Adams
(74) *Attorney, Agent, or Firm* — Boyle Fredrickson, S.C.

(57) ABSTRACT

A bicycle handlebar assembly that includes a number of grip sites, forearm supports, and a number of structures that have airfoil shaped cross-sections and that provide a highly adjustable handlebar assembly with improved aerodynamic performance across the range of adjustment of the handlebar assembly. The handlebar assembly includes a pair of shim stacks that each includes a number of shims that are selectively mountable to the handlebar assembly to adjust a relative vertical height of left hand and right hand aerobars and arm pads. The aerobars and arm pads are secured to the handlebar by way of corresponding clamping assemblies such that the aerobars and arm pads are movably secured to the handlebar assembly to provide the highly adjustable aero handlebar assembly.

20 Claims, 8 Drawing Sheets

U.S. PATENT DOCUMENTS

| | | |
|---|---|---|
| 2007/0277641 A1 | 12/2007 | Versey |
| 2008/0036170 A1 | 2/2008 | Vroomen et al. |
| 2008/0053266 A1 | 3/2008 | Smolik |
| 2008/0168857 A1 | 7/2008 | Chiang |
| 2009/0013819 A1 | 1/2009 | Nicol |
| 2009/0095116 A1 | 4/2009 | Barnes et al. |
| 2010/0000368 A1 | 1/2010 | Poertner et al. |
| 2010/0000369 A1 | 1/2010 | Cote |

FOREIGN PATENT DOCUMENTS

| | | |
|---|---|---|
| WO | WO 2006/050030 A2 | 5/2006 |
| WO | WO 2007/104943 A2 | 9/2007 |
| WO | WO 2010/048133 A1 | 4/2010 |

* cited by examiner

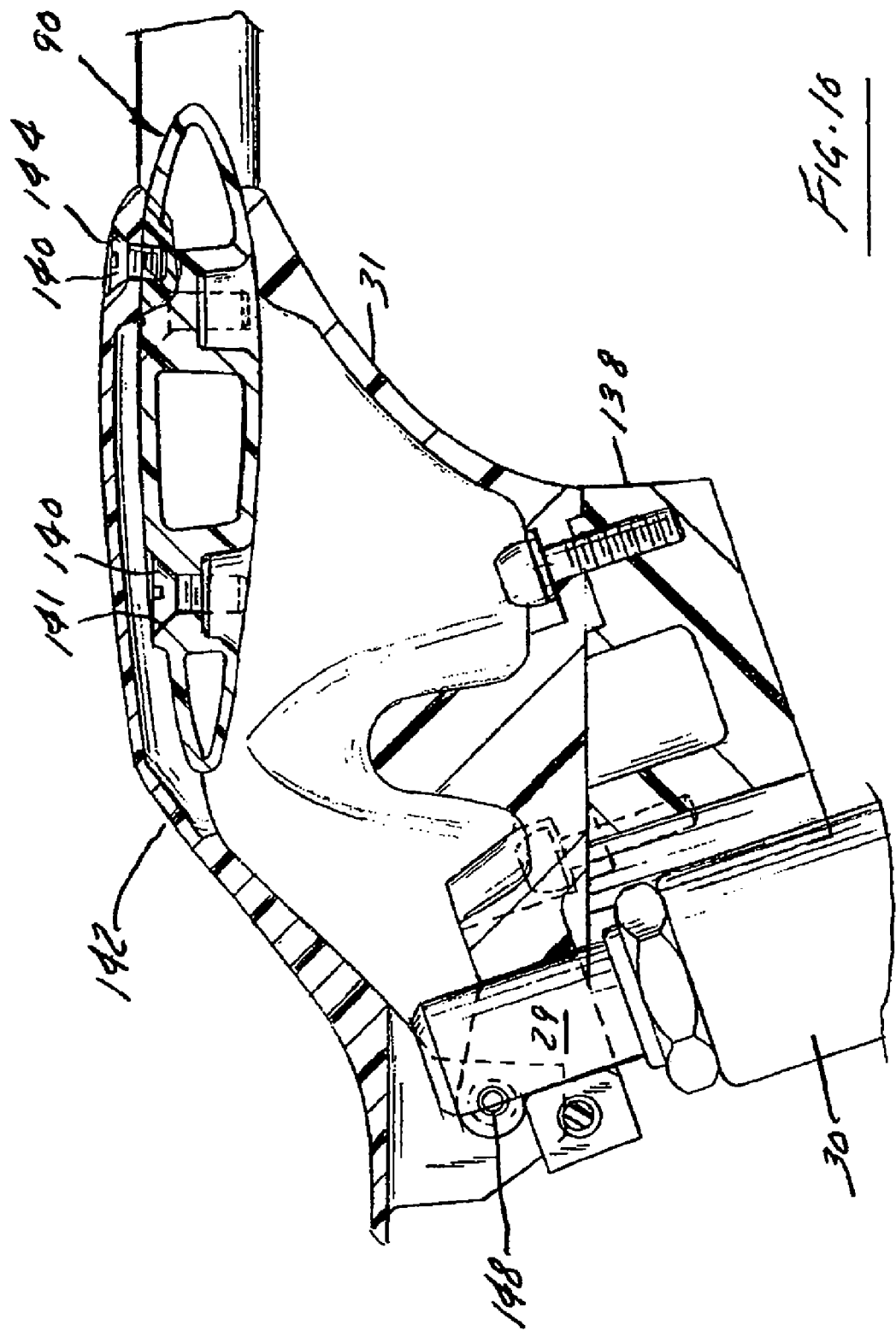

BICYCLE AERO HANDLEBAR ASSEMBLY

CROSS-REFERENCE TO RELATED APPLICATIONS

This application claims priority to U.S. Provisional Patent Application Ser. No. 61/361,004 titled "Bicycle Aero Handlebar Assembly" which was filed on Jul. 2, 2010 and the disclosure of which is expressly incorporated herein.

BACKGROUND OF THE INVENTION

The present invention relates generally to bicycles and, more particularly, to a bicycle aero handlebar assembly that is adjustable and aerodynamically shaped thereby providing improved aerodynamic function and configurability to satisfy a number of user preferences with respect to the spatial relationship of various grip sites and forearm supports.

A number of bicycle aero handlebar assemblies are known in the art. These known aero handlebar assemblies suffer from a number of disadvantages. For one, many known aero handlebar assemblies are generally not at all adjustable and those that are adjustable lack a degree of adjustability that allow a single aero bar assembly to provide a desired configuration for more than but a few rider physiologic preferences. That is, while known aero handlebar assemblies may allow for the adjustment of the positioning of the components of the assembly, heretofore known aero handlebar assemblies are still considerably lacking in the ability to adjust to a large number of widely varying aero handlebar assembly configurations. Thus, existing aero handlebar assemblies are less than ideal for a large number of potential users thereby requiring manufacturers to provide a large number of aero handlebar assemblies to satisfy the varied demands of the market.

Moreover, known aero handlebar assemblies are not sufficiently aerodynamic. As is generally understood, aero handlebar assemblies are generally utilized on bicycles designed and constructed for use with road riding and are generally more specific to road racing bicycles. One of the major considerations of all racing bicyclists is the aerodynamics of his or her bicycle. In known aero handlebar assemblies, there exist a number of constructions that are less than ideal from an aerodynamic standpoint. In this manner, overall bicyclist performance is adversely impacted.

Oftentimes, aero handlebar assemblies that are sufficiently adjustable to comfortably fit a wide range of rider sizes and preferences have a less than desirable aerodynamic construction. On the other hand, those aero handlebar assemblies that are constructed so as to be sufficiently aerodynamic oftentimes are lacking in adjustability characteristics necessary to comfortably fit a large number of rider sizes and preferences. Such drawbacks substantially increase the overhead associated with producing an aero handlebar assembly and limit the return on investment that can be achieved with any one particular aero handlebar assembly. Although producing an aero handlebar assembly on an on-demand basis, or otherwise specific to a given rider's preference, such a process would undesirably increase the lead time associate with providing a user with an aero handlebar assembly suitable to their given preferences.

Therefore, there is a need to provide a bicycle aero handlebar assembly that is constructed to provide a wide range of adjustability while maintaining a substantially aerodynamic construction across the entire range of adjustment of the aero handlebar assembly.

BRIEF DESCRIPTION OF THE INVENTION

The present invention provides a bicycle aero handlebar assembly that overcomes one or more of the aforementioned drawbacks. A bicycle aero handlebar assembly according to one aspect of the invention includes a horizontal bar having an airfoil shaped cross section as viewed in a vertical plane. Preferably, the airfoil shaped cross section extends along more than half of a longitudinal length or a majority of the longitudinal length of the horizontal bar. A first grip area and a second grip area are located at opposite ends of the horizontal bar. At least one shim is connected to a top side of the horizontal bar between the first grip area and the second grip area. A first clamp assembly is secured to a top of the at least one shim and includes a clamping area that defines an axis that extends in a direction generally aligned with a longitudinal axis of the horizontal bar. A second clamp assembly is secured to the first clamp assembly and defines a clamp axis that is oriented in a crossing direction relative to the axis of the first clamp assembly. An aerobar grip is engaged with the second clamp assembly so that the aerobar grip extends in a crossing direction with respect to the horizontal bar and so that a portion of the aerobar grip extends rearward of the second clamp. A third clamp assembly is configured to engage the aerobar grip rearward of the second clamp assembly. The third clamp assembly includes an arm that extends therefrom in a direction generally aligned with the horizontal bar. An arm pad assembly is selectively securable to the arm of the third clamp assembly at any number of positions.

Preferably, the shim of the aero handlebar assembly has a generally airfoil shaped horizontal cross section. A number of additional shims, e.g. second, third, and fourth shims, may be provided. More preferably, each additional shim has a cross-section that is generally the same as the at least one shim. Preferably, the cross section of adjacent shims is the same. Preferably, at least two of the shims have dissimilar longitudinal lengths and more preferably the longitudinal lengths of the first, second, third, and fourth shims vary to provide a number of common or commonly preferred aerobar/handlebar offsets. It is further appreciated that the length of each of the first, second, third, and fourth shims could have dissimilar longitudinal lengths.

A stem may be secured to an underside of the horizontal bar and may be oriented to be positioned forward of the head tube when connected to the bicycle. The stem may include a bolt flange located at one end thereof.

The aero handlebar assembly may further include a cover that overlaps a center portion of the horizontal bar, a head tube of the bicycle, and a steerer tube that passes through the head tube.

In another aspect of the present invention, a bicycle handlebar assembly system includes a handlebar having a vertically oriented airfoil-shaped cross-section. A stem is provided having a horizontally oriented partial airfoil shape and is secured to an underside of the handlebar and oriented to be positioned forward of a head tube of a bicycle frame when the assembly is attached thereto. An aerobar clamp assembly may be provided and configured to be secured to a top side of the handlebar and laterally offset from a laterally centerline of the handlebar. An aerobar engaged with the aerobar clamp and oriented to be selectively movable along a direction generally aligned with the laterally centerline of the handlebar may also be provided. A pad clamp assembly may be secured to the aerobar rearward of the aerobar clamp assembly and selectively movable therealong. The assembly may further include a pad assembly selectively securable to the pad clamp assembly and selectively moveable in a crossing direction relative to the aerobar and including a pad oriented to support a forearm of a rider positioned above the aerobar. The assembly may additionally include at least one shim captured between the aerobar clamp assembly and the handlebar and selectable to alter a distance between the aerobar and pad assembly and the handlebar.

The assembly may include a plurality of additional shims, such as, for example, a second, third and fourth shim that is constructed in much the same manner as the first shim. In one construction of the invention, the plurality of additional shims has a length that is different the length of first shim. Moreover, at least one of the plurality of shims may include an airfoil-shaped, generally horizontal cross-section. Each of the plurality of shims may have similar horizontal cross-sectional shapes.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

FIG. 10 is a cross-section view of the stem assembly shown in FIG. 9 taken along line 10-10 shown in FIG. 2.

DETAILED DESCRIPTION OF THE PREFERRED EMBODIMENTS

Figure 1:
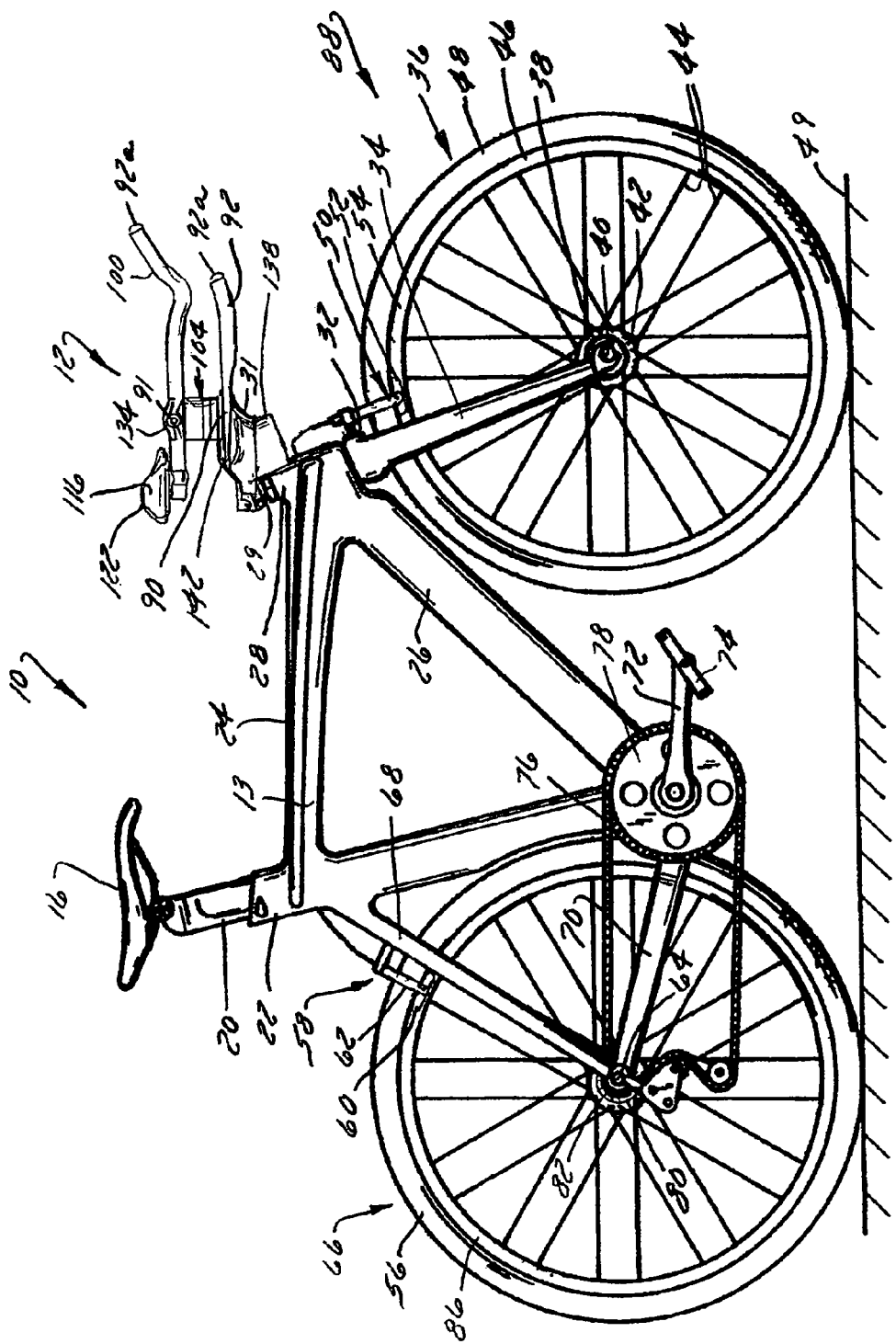
FIG. 1 is a side elevation view of a bicycle having an aero handlebar assembly according to the present invention.

FIG. 1 shows an exemplary bicycle 10 equipped with an aero handlebar, aero handlebar assembly, or simply a handlebar assembly 12 according to the present invention. Handlebar assembly 12 is connected to a fork or steerer assembly 14 of bicycle 10 and is rotatable relative to bicycle 10 to effectuate steering of the bicycle. Handlebar assembly 12 and a seat 16 are attached to a frame 13 of bicycle 10. A seat post 20 is connected to seat 16 and slidably engages a seat tube 22 of frame 13. A top tube 24 and a down tube 26 extend in a forward direction from seat tube 22 to a head tube 28 of frame 13. Handlebar assembly 12 is rigidly connected to a shaft or steerer tube 30 that passes through head tube 28 and is secured or otherwise attached to a fork crown 32 of steerer assembly 14. Handlebar assembly 12 is rotatably attached to bicycle 10 such that handlebar assembly 12 and fork crown 32 rotate about a longitudinal axis of steerer tube 30.

Steerer assembly 14 includes a pair of forks, fork blades or fork legs 34 that extend from generally opposite lateral sides of fork crown 32. Fork legs 34 support a front wheel assembly 36 at an end thereof or dropout assembly 38. Dropout assemblies 38 engage generally opposite sides of an axle 40 that is engaged with a hub 42 of front wheel assembly 36. A number of spokes 44 extend from hub 42 to a rim 46 of front wheel assembly 36. A tire 48 is engaged with rim 46 such that rotation of hub 42 and rim 46, relative to fork legs 34, rotates tire 48 relative to a ground surface 49. As is commonly understood, side to side rotation of handlebar assembly 12 turns front wheel assembly 36 in a lateral direction to facilitate steering of bicycle 10.

Bicycle 10 includes a front brake assembly 50 that is operationally connected to an actuator that is attached to handlebar assembly 12 at a location proximate interaction of the rider's hands with handlebar assembly 12. The brake assembly includes a pair of brake pads 52 that are positioned on generally opposite lateral sides of front wheel assembly 36. The brake pads selectively engage a brake wall 54 of rim 46 and thereby provide a stopping or slowing force to front wheel assembly 36. The brake pads are attached to a caliper assembly that is operationally connected to the handlebar supported actuator by a brake cable or other flexible driving member, such as a fluid connection member. It is further appreciated that although brake assembly 50 is shown as what is commonly understood as a rim brake, brake assembly 50 could alternatively be configured as a disk brake system wherein the brake assembly is positioned nearer the hub of the wheel assembly and interacts with a disk secured thereat. Examples of both such systems are fairly common in the art.

Still referring to FIG. 1, bicycle 10 includes a rear wheel assembly 56 that is also equipped with a brake assembly 58. Brake assembly 58 includes a pair of brake pads 60 that are manipulated by a caliper 62 that extends about generally opposite lateral sides of rear wheel assembly 56. Rear wheel assembly 56 includes a rear wheel 66 that is supported by a rear axle 64. Rear wheel brake assembly 58 interacts with rear wheel 66 in a manner similar to the association of the front brake assembly and front wheel assembly 36. Those skilled in the art will appreciate that front and rear brake assemblies 50, 58 are merely exemplary of one brake assembly useable with bicycles 10. It is appreciated that either or both of front and rear wheel assemblies 36, 56 could be provided with other braking arrangements such as disc brake assemblies as discussed above.

Axle 64 of rear wheel assembly 56 is offset from a crankset 72 by one or more seat stays 68 and chain stays 70. Crankset 72 includes a set of pedals 74 that is operationally connected to a flexible drive member such as a chain 76 via a gear set, chain ring, or sprocket 78. Rotation of chain 76 communicates a drive force to a gear cluster 80 positioned proximate rear axle 64. Gear cluster 80 is generally concentrically orientated with respect to rear axle 64 and includes a number of variable diameter gears.

Gear cluster 80 is operationally connected to a hub 82 of rear wheel 66. A number of spokes 84 extend radially between hub 82 and a rim 86 of rear wheel 66 of rear wheel assembly 56. As is commonly understood, rider operation of pedals 74 drives chain 76 thereby driving rear wheel 66 which in turn propels bicycle 10. Steerer assembly 14 supports a forward end 88 and rear wheel assembly 56 supports a rearward end 89 of bicycle 10 above ground surface 49. Handlebar assembly 12 is connected to frame 13 and steerer assembly 14 such that rider manipulation of handlebar assembly 12 is communicated to steerer assembly 14 to facilitate turning of front wheel assembly 36 relative to frame 13 with respect to a longitudinal axis of bicycle 10. As is commonly understood, such manipulation of handlebar assembly 12 steers bicycle 10 during riding.

Understandably, the construction of bicycle 10 shown in FIG. 1 is merely exemplary of a number of bicycle configurations. That is, whereas bicycle 10 is shown as what is commonly understood as cross-over or multi-purpose bicycle, it is appreciated that handlebar assembly 12 is useable with other bicycle configurations such as bicycles intended to be ridden on only paved surfaces, commonly referred to a street or road bike, as well as off-road, hybrid, mountain, and/or dirt bikes, commonly configured to be primarily ridden on unpaved surfaces, as well as cross-over bicycle configurations that are configured to be ridden on both paved and unpaved surfaces.

Figure 2:
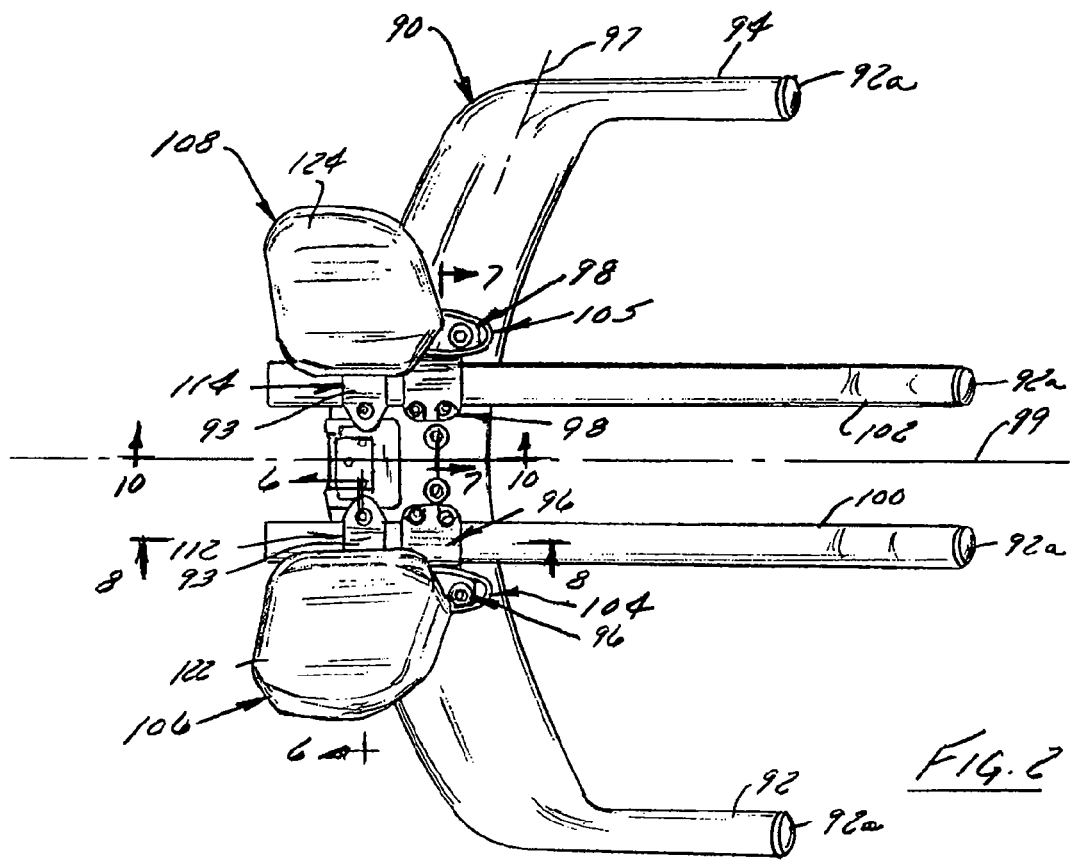
FIG. 2 is a top plan view of the aero handlebar assembly shown in FIG. 1 removed from the bicycle.
Figure 3:
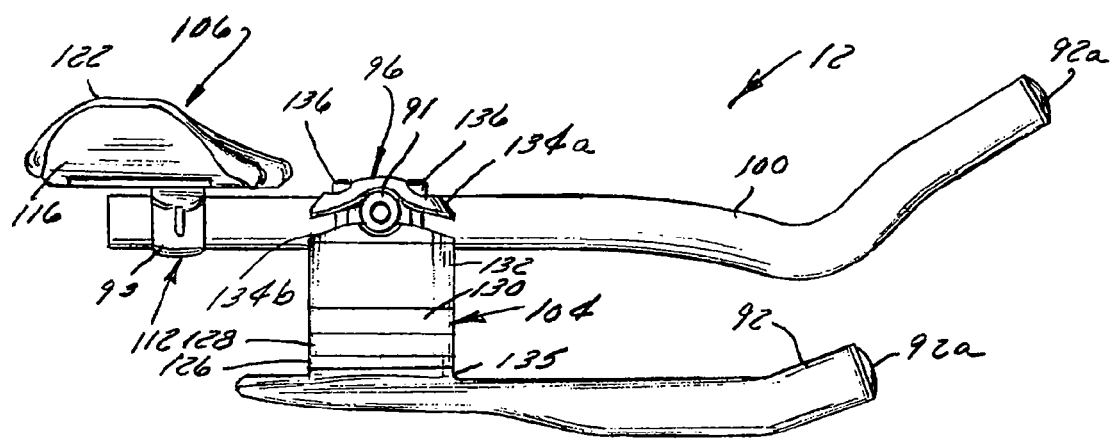
FIG. 3 is a side elevation view of the bicycle aero handlebar assembly shown in FIG. 2.

FIGS. 2 and 3, show handlebar assembly 12 removed from bicycle 10. As described further below, handlebar assembly 12 has a shape that is commonly understood in the art as an aerobar handlebar assembly and provides alternate grip sets and forearm rests that are oriented generally above a horizontal bar of handlebar assembly 12. In at least one construction, the grip sites provided by the aerobar bars are oriented forward and laterally to the center of the grip sites provided by the elongated body associated with the laterally extending horizontal bar of handlebar assembly 12. Handlebar assembly 12 includes a horizontal bar or handlebar 90 including a pair of grips, i.e. first grip 92 and second grip 94, on opposite sides of the horizontal bar 90. First and second grips 92, 94 extend forward relative to a generally forward sweeping longitudinal axis, indicated by line 97, of horizontal bar 90 to define a first pair of grip locations. Preferably, horizontal bar 90 has an airfoil shaped cross section relative to a vertical plane. Preferably, the airfoil shaped cross section extends along a majority bar 90.

A first clamp assembly 96 and a second clamp assembly 98 are secured to horizontal bar 90 between the first grip 92 and second grip 94 along longitudinal length 97 and spaced from one another across a lateral centerline, indicated by line 99, of the horizontal bar 90. Centerline 99 is generally aligned with a longitudinal centerline of bicycle 10. Each of the first clamp assembly 96 and the second clamp assembly 98 includes clamping area defining an axis that extends in a direction generally aligned with centerline 99 of horizontal bar 90. The first clamp assembly 96 and the second clamp assembly 98 are configured to secure a respective first aerobar grip 100 and a second aerobar grip 102 to handlebar assembly 12. Each of the first aerobar grip 100 and second aerobar grip 102 has a length sufficient to cooperate with the clamp assemblies 96, 98 respectively so that a portion of each of the first and second aerobar grips 100, 102 extends in a rearward direction with respect to the respective clamp assemblies 96, 98. As explained further below, at least one shim or spacer 104, 105 is provided at each of the first and second clamp assemblies 96, 98 and vertically offsets clamp assemblies 96, 98 from bar 90. Alternatively, as explained further below, it is envisioned that a lower element 134b associated with each clamp assembly 96, 98 could be secured directly to horizontal bar 90 such that only the respective clamp assembly 96, 98 provides the offset between horizontal bar 90 and a respective corresponding aerobar 100, 102.

Handlebar assembly 12 further includes an arm pad assembly 106 that includes right arm or a first arm pad 108 and a left arm or second arm pad 110. Arm pads 108, 110 are secured handlebar assembly 12 in a vertically offset spatial relation relative to a top of the horizontal bar 90 by way of a respective third clamp assembly or first arm pad clamp assembly 112 and a fourth clamp assembly or second arm pad clamp assembly 114 respectively. The third and fourth clamp assemblies 112, 114 are configured to be secured to the portion of first and second aerobar grips 100, 102 that extends rearward of the first and second clamping assemblies 96, 98. Arm pads 108, 110 provided a support rest for the forearms of a rider of the bicycle 10 when the rider's hands are engaged with forward distal ends of grips 100, 102. In this manner, arm pads 108, 110 may have any shape and may be constructed of any material consistent with providing a comfortable forearm rest for a rider of the bicycle 10. As is commonly understood, arm pads 108, 110 and grips 100, 102 allow a rider to attain a more comfortable "tucked" position to improve the aerodynamic cross section of the rider during use of bicycle 10.

Figure 4:
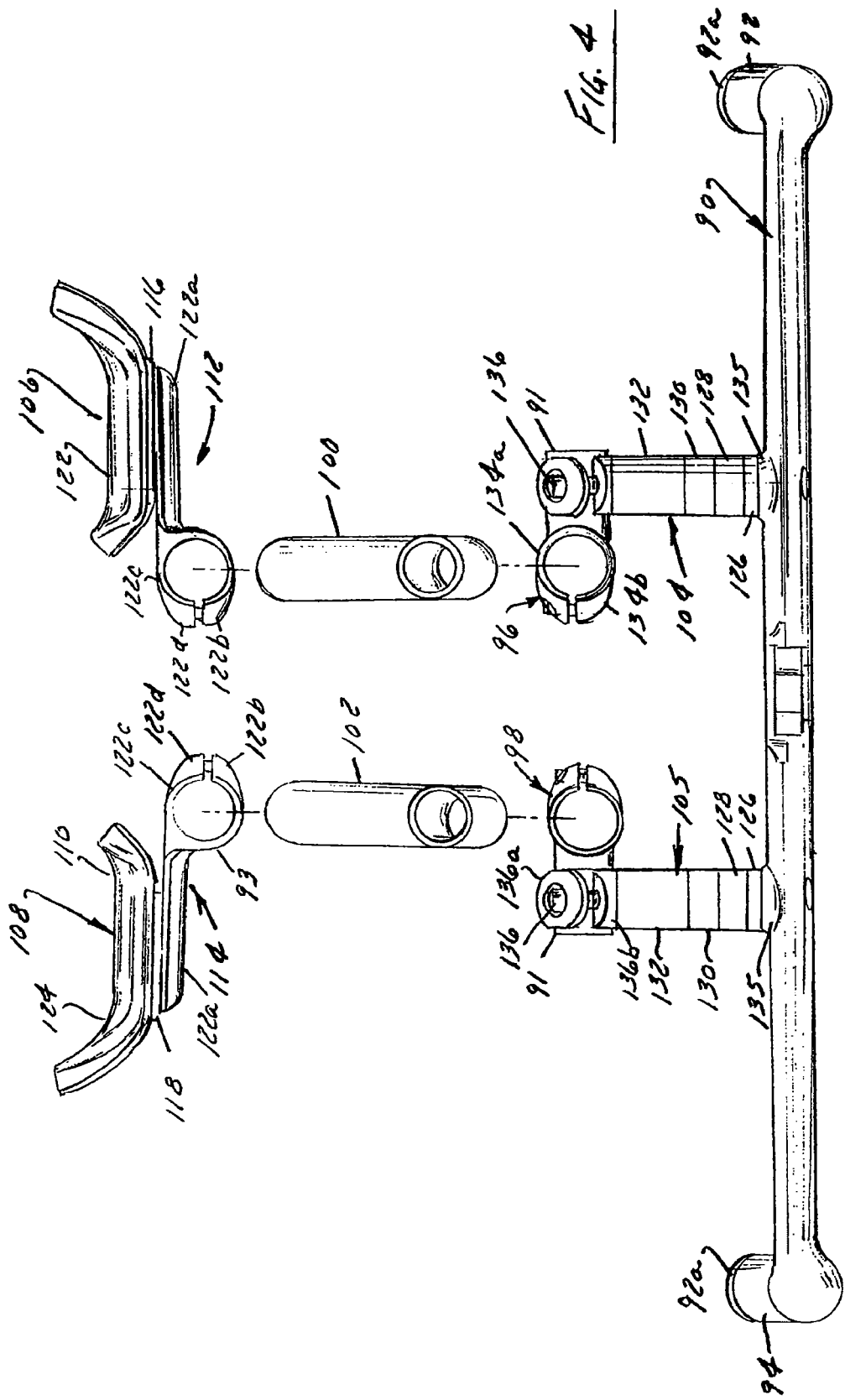
FIG. 4 is a partial exploded view of the bicycle aero handlebar assembly shown in FIG. 2.
Figure 5:
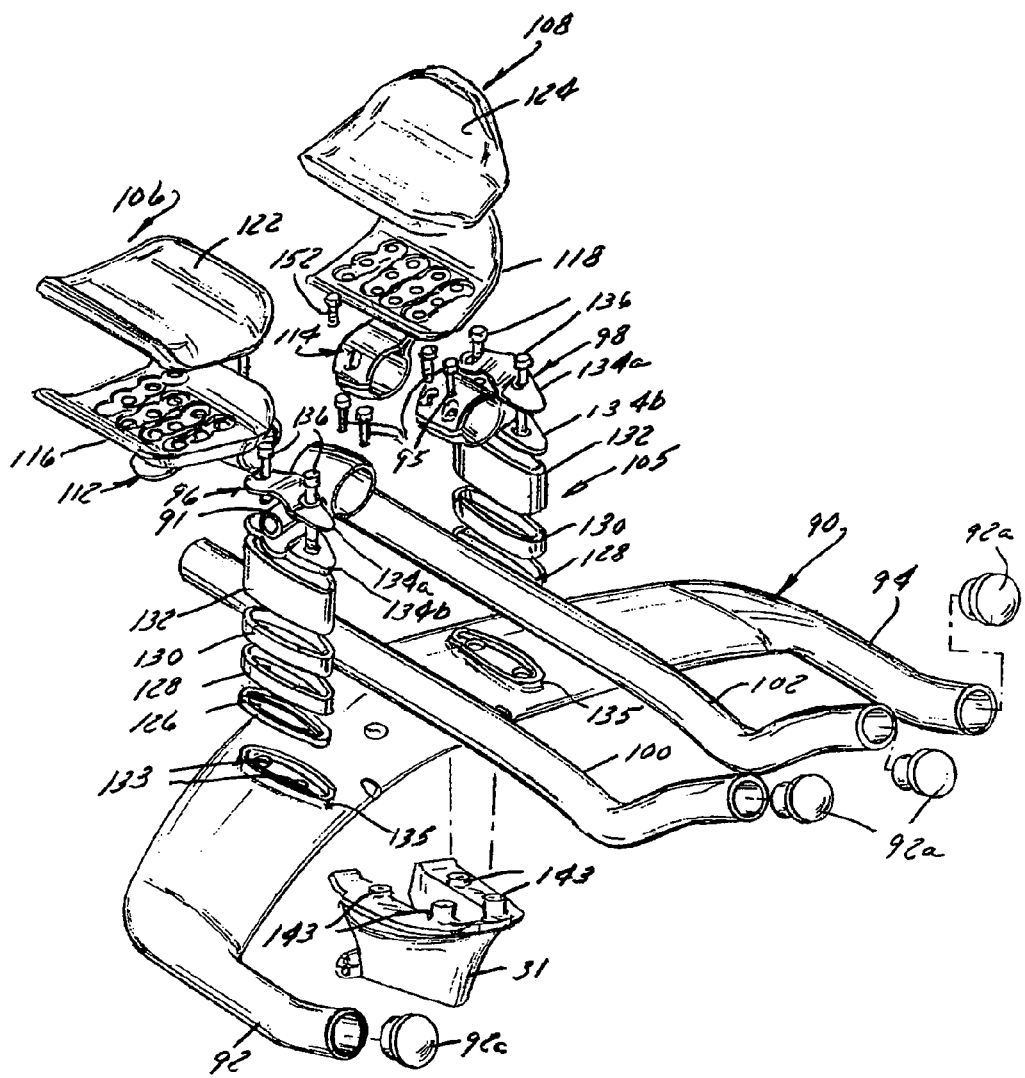
FIG. 5 is a perspective exploded view of the bicycle aero handlebar assembly shown in FIG. 2.

Referring to FIGS. 4 and 5, horizontal bar 90 and grips 92 and 94 form a generally planar structure in which the grips 92, 94 are positioned at opposing longitudinal ends of the horizontal bar 90 and extend forward with respect thereto. Grips 92, 94 are canted slightly upwardly at an end thereof to facilitate comfortable gripping by the rider of the bicycle 10. Of course, grips 92, 94 may have any number of alternative constructions in keeping with the present invention. For instance, grips 92, 94 may be entirely elongate or may have a number of different gripping points along the length thereof. The foregoing is merely exemplary of the construction of the grips 92, 94 and in no way limits the structure thereof.

Referring still to FIGS. 4 and 5, first and second clamp assemblies 96, 98 are provided between the grips 92, 94 and are spaced from one another across the centerline 99 of the horizontal bar 90 and vertically offset therefrom. In particular, horizontal bar 90 includes a pair of shim stacks 104, 105 provided on opposing sides of the centerline 99 of the horizontal bar and extending generally upward from the horizontal bar 90. Preferably, shim stacks 104, 105 are constructed of a number of individual shims or spacers. Shim stacks 104, 105 are configured to selective adjust a relative height of the aerobars 100, 102 with respect to horizontal bar 90. Shim stacks 104, 105 may extend across the entire width of the horizontal bar 90. It is further appreciated that at least a portion of shim stacks 104, 105 may be integrally formed with horizontal bar 90 and configured to extend generally orthogonally with respect to a plane defined by the horizontal bar 90.

Still referring to FIGS. 4 and 5, shim stacks 104, 105 include a number of individual shim or spacer elements; in particular, each of the shims 104, 105 includes a first shim element 126, a second shim element 128, a third shim element 130, and a fourth shim element 132. Each of the individual shim elements 126-132 is configured to provide a desired elevation to each of the respective, associated arm pads 108, 110 and forward extending aerobars 100, 102. It is envisioned that shim elements 126-132 may have any desired vertical length and that one or more of the shim elements 126-132 be used for any given user's desired configuration/orientation of the handlebar assembly 12 with the bicycle 10. Although shown as having different respective vertical lengths, it is further appreciated that shim elements 126-132 could be provided to have uniform vertical length but preferably, at least two of shim elements 126-132 have different vertical lengths. That is, it is appreciated that shim elements 126-132 could be provided as a stack-up of shims having uniform or different vertical lengths. Although the shim elements 126-132 may have different shapes, it is envisioned that each of the shim elements 126-132 are constructed to cooperate with one another in a manner that provides a generally continuous and uniform outer surface for the transition from the handlebar 90 to the aerobar clamp assemblies 104, 105 and along the respective shims elements of each respective desired shim stack. As explained further below, each shim of each respective shim stack preferably indexes relative to each additional discrete shim of a respective shim stack.

Each of the shim stacks 104, 105 further includes a top clamp or top clamp assembly 134 having a cross-sectional shape similar to that of each of the individual shim elements 126-132 and that is configured to cooperate with a number of fasteners 136 that are configured to secure the shims 104, 105 and the top clamp assembly 134 to the horizontal bar 90. In particular, top clamps 134 include a two-piece construction and include an upper element 134a and a lower element 134b. Upper element 134a and lower element 134b include complementary recesses that cooperate with one another to define a recess for securing the respective first and second clamp 96, 98 thereto. As disclosed above, it is further envisioned that top clamp assemblies 134 be secured directly to horizontal bar 90. In particular, the upper element 134a includes a generally planar construction with a raised portion at a lateral centerline thereof that defines the respective recess. The lower element 134b includes a complementary recess and has a construction that is generally planar and includes a recess formed along a lateral centerline thereof and that complements that recess of the upper element 134a to define an area for receiving the respective first and second clamps 96, 98. Upper element 134a and lower element 134b are secured to one another by way of a number of fasteners 136. In particular, the upper element 134a and lower element 134b include holes positioned on laterally opposing ends of the upper element 134a and lower element 134b and that are aligned with one another so that the fasteners 136 may be received therethrough to secure the upper and lower elements to one another. Top clamps 134 are configured to cooperate with the fourth shim 132 in a complementary manner such that the top clamps 134 are engageable therewith for securing the top clamp 134 to the horizontal bar 90 via the shim stacks 104, 105. Understandably, the shim stacks 104, 105 are configured so that one or more of the individual shims 126-132 may be entirely absent and accordingly, the top clamps 134 may be configured to engage any of the individual shims in the same manner as previously discussed with respect to the fourth shim 132.

Figure 7:
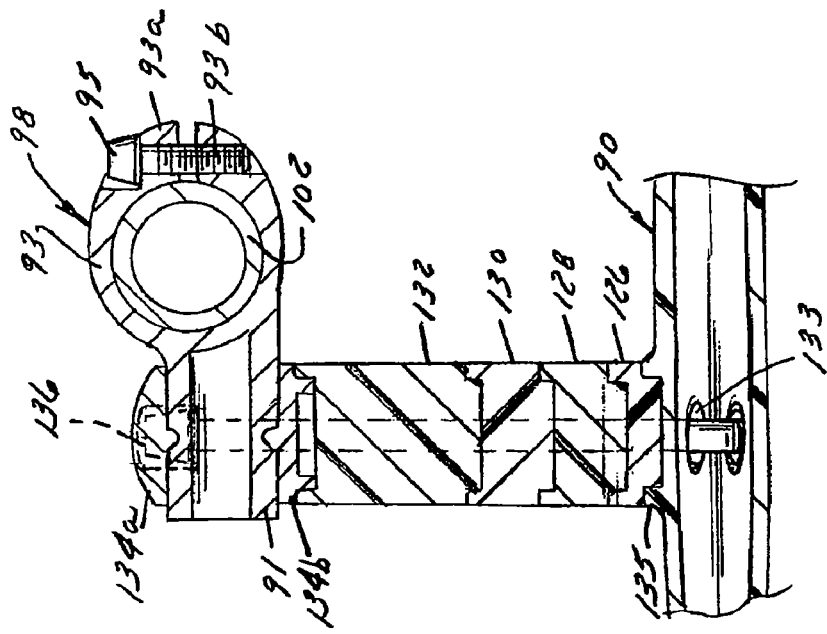
FIG. 7 is a cross-section view of a mounting of an aerobar clamp and shim stack of to the aero handlebar assembly shown in FIG. 2 and taken along line 7-7 shown in FIG. 2.

Referring now to FIGS. 4-5 and 7, understandably, the length of the fasteners 136 is selected to secure the first clamp assembly 96 to the handlebar 90 with the desired number of length of shim elements 126-132 spacing positioned therebetween. It is further envisioned that the length of the fasteners that secure the clamp assembly to the handlebar 90 is selected so that the fasteners 136 do not extend an appreciable degree beyond an upper surface of the associated clamp assembly and do not extend beyond a downward facing surface of the handlebar 90. In particular, as shown in FIG. 5, the fasteners 136 may have a length sufficient to be insertable through each of the shims 126-132 such that the distal ends of the fasteners 136 are received in horizontal bar 90. In particular, horizontal bar 90 may include one or more corresponding recesses 133 for receiving the fasteners 136 and for securing the top clamp 134 to the horizontal bar 90. Further, horizontal bar 90 may include an engaging portion 135 that is configured to engagingly receive the first shim 126 in a secure manner to thereby secure the shim stack 104, 105 to the horizontal bar 90. Engaging portion 135 may be shaped and sized in much the same manner as each of the respective shims 126-132 of shim stacks 104, 105 and may cooperate with each in much the same manner as the shims 126-132 cooperate with one another to define the shim stacks 104, 105. Moreover, the recesses 133 may be located within the interior of the area defined by engaging portion 135.

Referring back to FIGS. 4 and 5, first and second clamps 96, 98 include an elongate stem 91 that is received between the upper element 134a and lower element 134b. First and second clamps 96, 98 extend longitudinally toward the centerline 99 of horizontal bar 90 from shim stacks 104, 105 respectively and terminate in a clamp end 93 having a generally circular cross-section. Clamp end 93 may include a break in the outer circumference thereof so that the clamps 96, 98 are capable of expanding to accommodate different sizes of aerobars 100, 102. In particular, as shown in FIG. 7, clamp end 93 may include an inner circumference 93a in which the respective aerobar 100, 102 is to be received. The inner circumference is surrounded by a generally C-shaped outer portion 93b. The outer portion 93b defines an opening along an inwardly facing end thereof and defines a pair of apertures through which the fasteners 95 may be received. In this manner, the outer portion 93b may be tightened with respect to the inner circumference 93a in a manner such as to tighten the inner circumference 93a with respect to the aerobar 100, 102.

Alternatively, clamp ends 93 may be configured to accommodate differently sized aerobars in any number of alternative manners. Clamp ends 93 may include a pair of laterally spaced holes in an upper portion thereof for receiving a pair of fasteners 95. Fasteners 95 are configured to be inserted into the holes of clamp ends 93 and adjusted so as to tighten the clamp ends 93 to the aerobars 100, 102. Likewise, the fasteners 95 may be loosened as desired so that the aerobars may be slidably moved with respect to clamp ends 93 either rearward or forward with respect to bicycle 10 to adjust an effective length of aerobars 100, 102 with respect to the bicycle 10 to accommodate a particular rider's preference. It is further appreciated that a similar manipulation of clamps 96, 98 allows rotation of aerobars 100, 102 to provide a desired inward or outward directed tipping of the grip areas provided aerobars 100, 102 relative to vertical to accommodate a desired rider wrist position when engaged therewith.

Each of the grips 92, 94 and aerobars 100, 102 may have a generally tubular construction and include an open end at a forward end thereof. When assembled, one or more plugs 138 may be provided to cooperate with the respective tubular ends of the grips 92, 94 and aerobars 100, 102. Plugs 138 may be constructed out of plastic, metal, or any other suitable material. It is further appreciated that braking and/or shifting assembly levers can be supported at the forward ends of aerobars 100, 102.

Figure 6:
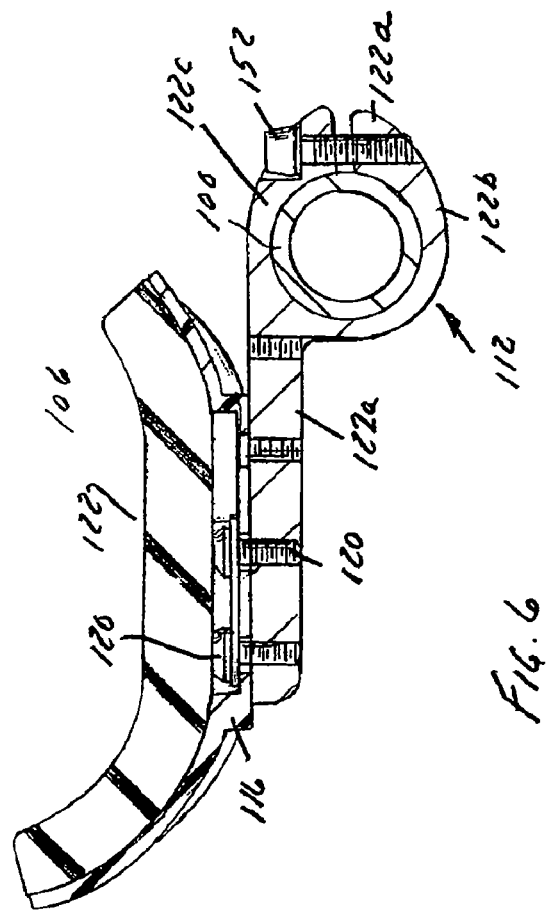
FIG. 6 is a cross-section view of an arm pad mount and arm pad assembly of the aero handlebar assembly shown in FIG. 2 and taken along line 6-6 shown in FIG. 2.

Still referring to FIGS. 4 and 5 as well as FIG. 6, arm pad assembly 106 is shown in detail. Each arm pad 108, 110 of the arm pad assembly 106 includes arm pad clamp 112, 114, a pad holder 116, 118, and one or more fasteners 120 that secure the pad holders 116, 118 to the respective pad clamp assemblies 112, 114, and a pad 122, 124, respectively. Alternatively, it is envisioned that a flexible fastener such as, for example, a hook and loop fastener or a two ply tape material could be disposed between each of the pads 122, 124 relative to the corresponding pad holder 116, 118.

Arm pad clamp 112 includes a generally elongate stem element 122a and an integrally formed arm pad clamp end 122b. Arm pad clamp end 122b may have a similar construction to that of clamp ends 93 of first and second clamps 96, 98. In particular, arm pad clamp end 122b may include a generally round cross section internal circumference area 122c and an external C-shaped portion 122d that surrounds the internal circumference area. The C-shaped portion 122d includes at least one aperture for receiving a fastener 152. In this manner, the fastener 152 may be inserted into the aperture of the C-shaped portion to thereby exert a force on the internal circumference area to thereby clamp the arm pad clamp end 122b to the aerobar 100, 102. Likewise, the fastener 152 may be loosened to enable movement of the aerobar 100, 102 with respect to the clamp 98 as explained above. In this manner, the position of the aerobar with respect to the arm pad 108 may be individually adjusted. Arm pad 110 comprises an identical or mirror image construction of arm pad 108. In this manner, the arm pads 108, 110 may be independently adjusted with respect to one another to accommodate a desired positioning.

FIGS. 4-6 and 8, show further detail of the mounting of arm pad assemblies 106, 108. As shown therein, pad 122 is coupled to its respective holder 116 via a pair of fasteners 120. Holder 116 may include a number of apertures through which the ends of the fasteners 120 may be received. The heads of the respective fasteners 120 are secured to an underside of the respective pad 122 so as to secure the pad 122 to the holder 116.

As shown, the centrally positioned aerobars 100, 102 extend further in a forward direction than the laterally, outward oriented opposite outer grips 92, 94 defined by horizontal bar 90. Moreover, the arm pads 106, 108 are located partially rearward of the horizontal bar 90 and extend in a generally forward and slightly upward direction at the generally opposite lateral ends of bar 90 relative to lateral centerline 99 of the horizontal bar 90. The arm pads 106, 108 are independently adjustable relative to the ends of the horizontal bar 90 and sweep in a generally forward direction as they approach the lateral centerline 99 of the horizontal bar 90.

Figure 8:
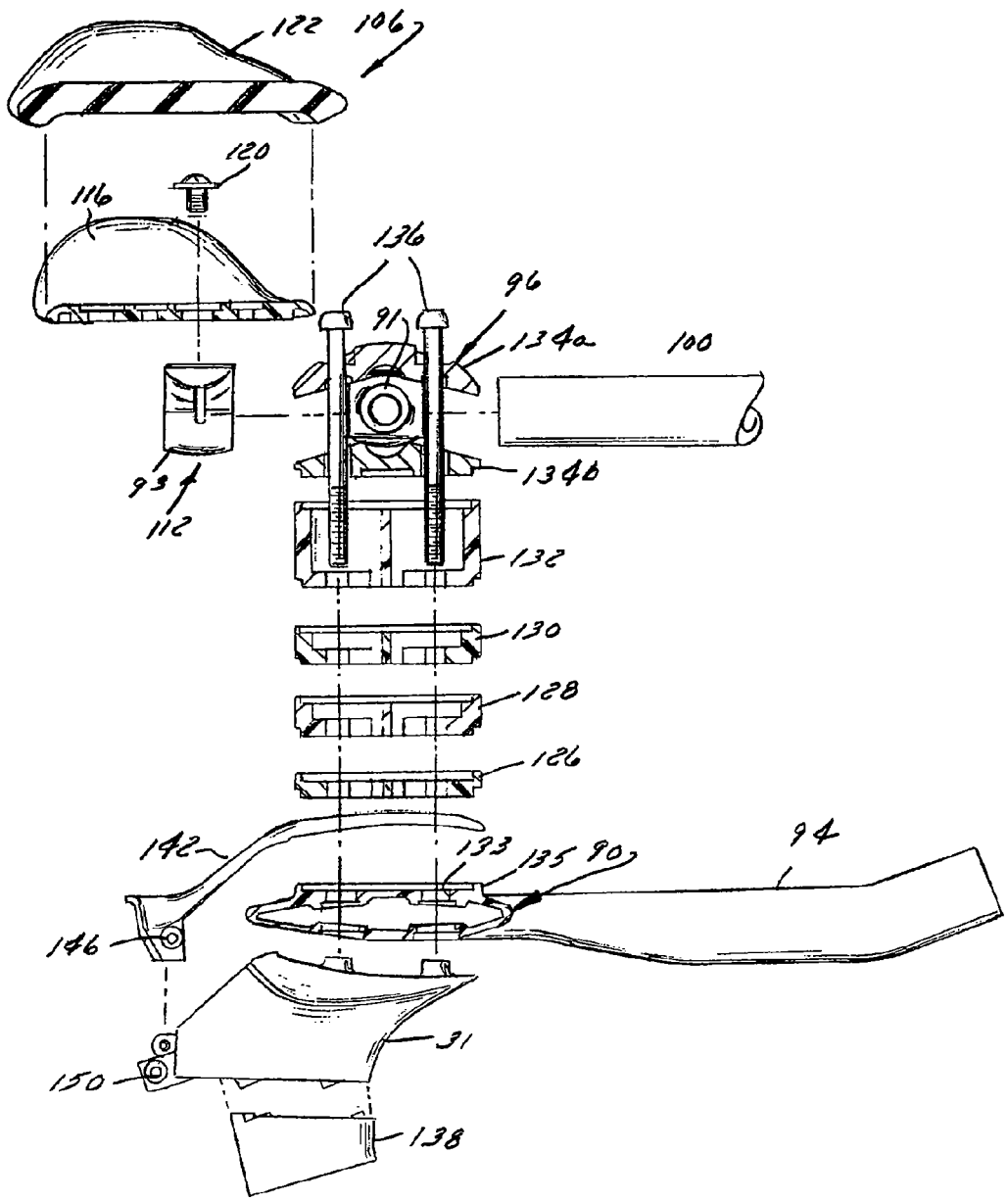
FIG. 8 is an exploded cross-section view of the aero handlebar assembly of shown in FIG. 2 and taken along line 8-8 shown in FIG. 2.
Figure 9:
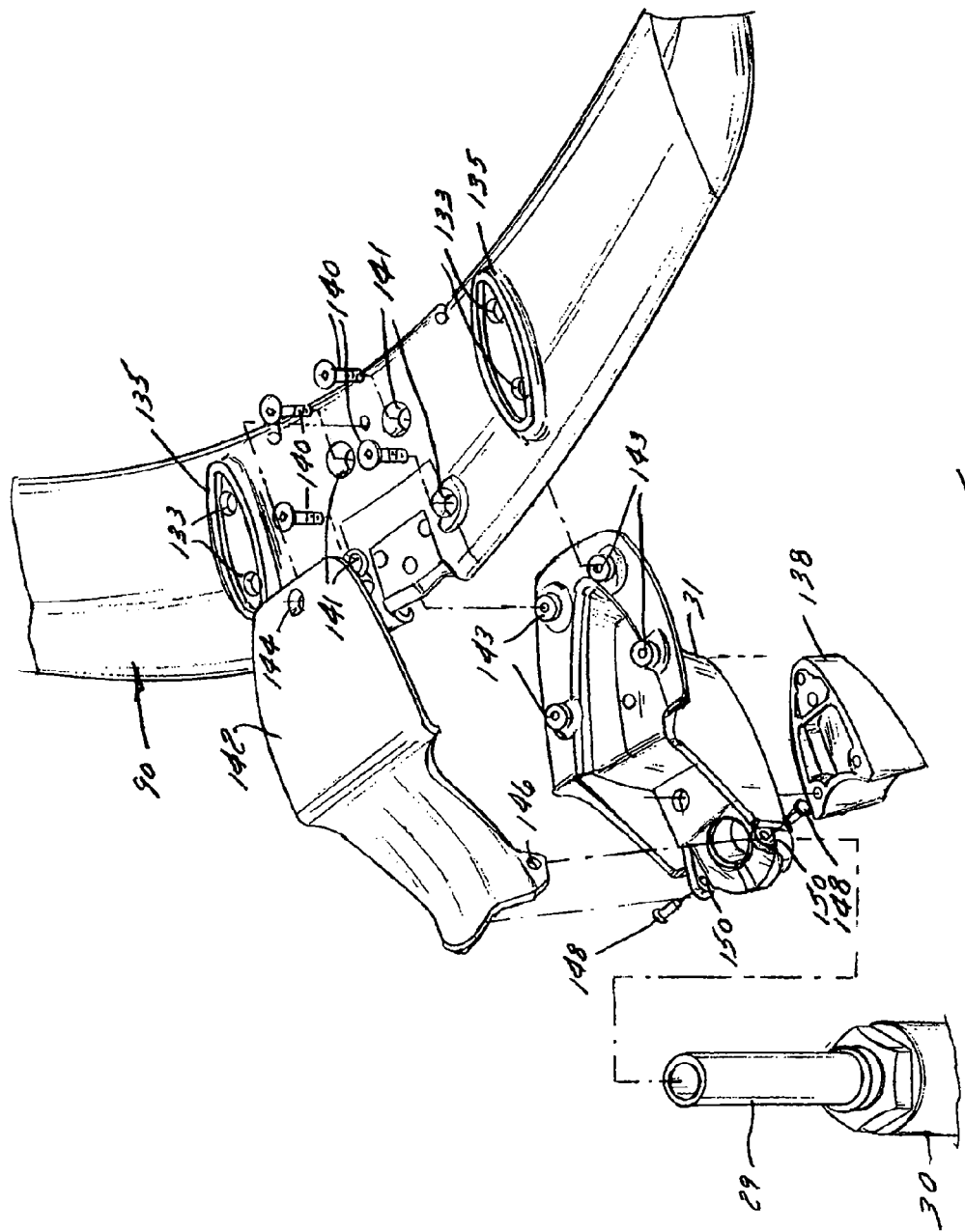
FIG. 9 is an exploded perspective view of a stem assembly of the aero handlebar assembly removed from a steerer assembly of the bicycle shown in FIG. 1.

Referring now to FIGS. 8-9, the construction of horizontal bar 90 and the mounting of the stem 31 thereto is illustrated in detail. As shown in FIG. 8, stem 31 extends in an upward and forward direction when associated with a bicycle such that handlebar 90 is located generally forward and above an upper end of the steerer assembly of the underlying bicycle. It is appreciated that stem 31 can be provided in a number of shapes to provide the vertical and forward offset of the handlebar 90, and thereby provide a number of positions of grips 92, 94 of handlebar 90 relative to seat 16 of bicycle 10. Said in another way, it is envisioned to provide several different shaped stems 31 to accommodate different rider preferences for the positions of grips 92, 94. In one embodiment, it is envisioned to provide stem 31 one of a low-short, a low-far, a medium-short, medium-far, high-short, and high-far shape wherein the low, medium and high describes the vertical vector of the respective stem and the short and far description refers to the forward facing vector of the respective stem. Said in another way, the longitudinal length and the pitch of the stem relative to the steerer assembly can be manipulated to provide a number of alternate positions of handlebar 90 relative to bicycle 10 and thereby the distance and elevation of handlebar 90 relative to seat 16 to satisfy a number of user preferences.

Still referring to FIGS. 8 and 9, a number of perforations are formed through the horizontal bar 90 proximate a lateral axis normal to the longitudinal axis of the horizontal bar 90 through which a number of fasteners may be inserted for securing the stem 31 to the horizontal bar 90 as will be explained. The stem 31 and a fork top cap 138 are positioned generally below the horizontal bar 90. Fork top cap 138 is rotatable with handlebar assembly 12 relative to head tube 28 of bicycle 10. Preferably, top cap 138 extends along the length of head tube 28 and cooperates in an abutting engagement with a crown of the fork assembly. Preferably, one or more of the stem 31 and the fork top cap 138 include a hollow passage for passing one or more cables or conductors (not shown) from the handlebar assembly 12 to the underlying bicycle 10 in a manner in which the cables or conductors do not interfere with the aerodynamic performance of the bicycle 10 and the handlebar assembly 12.

Referring to FIGS. 8-10, a first set of fasteners is provided to secure the stem 31 to the fork top cap 138. The stem 31 may include a number of apertures for receiving the first set of fasteners so that the fasteners extend below the lower edge of the stem 31 and engage corresponding apertures formed in the fork top cap 138. In this manner, the stem 31 and the fork top cap 138 are securely fastened to one another and cooperate to define at least one passage for the passing of the cables or conductors as previously discussed. A second set of fasteners 140 are provided to secure the horizontal bar 90 to the stem 31. In particular, horizontal bar 90 may include a number of spaced apertures or perforations 141 configured to receive the fasteners 140 through for subsequent engagement with the stem 31 and a corresponding set of apertures or perforations 143.

A stem cover 142 cooperates with the upward and rearward facing side of the stem 31 and overlaps the fasteners 140 and encloses the upward directed side of the stem 31 and the center portion of the horizontal bar 90. Stem cover 142 may include a number of apertures for receiving fasteners (not shown) through the stem cover 142 for engagement with the horizontal bar 90 and the stem 31. Alternatively, stem cover 142 may snap-fittingly cooperate with stem 31 and/or bar 90 or be otherwise secured thereto in a non-perforated manner. As shown, stem cover 142 includes a single aperture 144 at a forward end thereof for receiving a single fastener that extends through the stem cover 142, horizontal bar 90 and into engagement with the stem 31 to secure the stem cover 142 to the stem 31. A set of opposing, longitudinally spaced apertures 146 may be provided in a generally horizontal orientation on a rearward portion of the stem cover 142. The apertures 146 are configured to receive a pair of fasteners 148 therethrough for engagement with a rearward portion of the stem 31 to thereby secure the rearward portion of the stem cover 142 to the stem 31. In particular, fasteners 148 are insertable through the horizontally oriented apertures 146 in the stem cover 142 and into engagement with corresponding horizontally oriented apertures 150 on a rearward portion of the stem 31.

The shim stacks 104, 105 and the adjustability of the arm pads 106, 108 and aerobars 100, 102 provide a bicycle handlebar assembly 12 that can be configured to accommodate a number of user preferences. The vertical extension and rotation of the forearm supports and the aerobar grip portions are each independently adjustable with respect to the elongated, laterally oriented handlebar. Furthermore, the aerodynamic shape of the horizontal bar 90 provides a bicycle handlebar assembly 12 that is highly adjustable to satisfy the preferences of a larger group of riders and provides a handlebar assembly 12 with improved aerodynamic performance.

The present invention has been described in terms of the preferred embodiment, and it is recognized that equivalents, alternatives, and modifications, aside from those expressly stated, are possible and within the scope of the appending claims.

What is claimed is:

1. A bicycle aero handlebar assembly comprising:
a horizontal bar;
a first grip area and a second grip area located at generally opposite ends of the horizontal bar;
at least one shim connected to a top side of the horizontal bar and disposed between the first grip area and the second grip area;
a first clamp secured to a top of the at least one shim and having a clamping area defining an axis that extends in a direction that is generally aligned with a longitudinal axis of the horizontal bar;
a second clamp secured to the first clamp and defining a clamp axis that is oriented in a crossing direction relative to the axis of the first clamp;

an aerobar engaged with the second clamp so that the aerobar extends in a crossing direction with respect to the horizontal bar and so that a portion of the aerobar extends rearward of the second clamp;

a third clamp configured to engage the aerobar rearward of the second clamp and including an arm that extends in a direction generally aligned with the horizontal bar; and an arm pad assembly securable to the arm of the third clamp at a plurality of positions.

2. The assembly of claim 1, wherein a generally horizontal cross section of the at least one shim is airfoil shaped about a vertical axis.

3. The assembly of claim 1, further comprising a second, third, and fourth shim, and wherein a cross-section of each of the second, third, and fourth shim are generally the same as the at least one shim and wherein at least two of the first shim, second shim, third shim, and fourth shim have different vertical lengths.

4. The assembly of claim 1, wherein the horizontal bar has an airfoil shaped cross-section oriented in a vertical plane.

5. The assembly of claim 1 further comprising a stem secured to an underside of the horizontal bar and oriented to be positioned forward of a head tube of a bicycle frame when the assembly is connected to a bicycle.

6. The assembly of claim 5 further comprising a number of fasteners that cooperate with the horizontal bar and the stem and secure the stem to the horizontal bar.

7. The assembly of claim 1 further comprising a cover that overlaps a center portion of the horizontal bar, a head tube of a bicycle, and a steerer tube that passes through the head tube.

8. A bicycle handlebar assembly system configured to be secured to a bicycle having a stem that is securable to an underside of the handlebar assembly such that the handlebar assembly extends upward and forward of a head tube of a bicycle frame, the bicycle handlebar assembly comprising:

an aerobar clamp assembly configured to be secured to the handlebar of the bicycle;

an aerobar engaged with the aerobar clamp assembly and oriented to be selectively moveable along a direction generally aligned with a lateral centerline of the handlebar;

a pad clamp assembly securable to the aerobar rearward of the aerobar clamp assembly and selectively moveable therealong;

a pad assembly selectively securable to the pad clamp assembly and selectively moveable in a crossing direction relative to the aerobar and having a pad oriented to support a forearm of a rider positioned above the aerobar; and at least one shim disposed between the aerobar clamp assembly and the handlebar and configurable to change a distance between the aerobar, the pad assembly, and the handlebar.

9. The bicycle handlebar assembly system of claim 8, wherein the at least one shim further comprises a plurality of shims including a second shim, a third shim, and a fourth shim, and wherein the plurality of shims are selectively engageable with the at least one shim to change the distance between the aerobar, the pad assembly, and the handlebar.

10. The bicycle handlebar assembly system of claim 9, wherein the at least one shim has a vertical length that is different than a vertical length of at least one of the second shim, the third shim, and the fourth shim.

11. The bicycle handlebar assembly system of claim 8, wherein the at least one shim has an airfoil shaped horizontal cross-section.

12. The bicycle handlebar assembly system of claim 11, further comprising a plurality of shims engageable with the at least one shim, and wherein each of the plurality of shims have similar horizontal cross-sectional shapes.

13. A bicycle having a frame that includes a head tube and a steerer tube that passes through and is rotatably supported by the head tube, the bicycle comprising:

a handlebar assembly including a horizontal bar secured to a stem and including a pair of grips formed at opposing ends of a longitudinal axis defined by the horizontal bar and extending forward from the horizontal bar, the handlebar assembly comprising, at least one shim stack including at least one shim secured to a topside of the horizontal bar at a location along the longitudinal axis between the pair of grips;

a top clamp engaged with the at least one shim stack;

a first clamp engaged with the top clamp and extending in a crossing direction with respect to the top clamp;

an aerobar moveably engaged with the first clamp so that the aerobar may be moved in a direction generally orthogonal to the longitudinal axis;

a first arm pad clamp movably secured to the aerobar rearward of the first clamp; and a first arm pad adjustably secured to the first arm pad for receiving a forearm of a rider of the bicycle.

14. The bicycle of claim 13, wherein the at least one shim stack comprises a plurality of shims selectively engageable with the topside of the horizontal bar for adjusting a relative height of the aerobar and the first arm pad with respect to the topside of the handlebar.

15. The bicycle of claim 13, wherein the handlebar assembly comprises a second shim stack comprising at least one shim, wherein the at least one shim stack and the second shim stack are disposed medially with respect to the grips and on opposing sides of a centerline of the handlebar assembly.

16. The bicycle of claim 15, wherein the handlebar assembly further comprises a second top clamp engaged with the second shim stack, a second clamp engaged with the second top clamp and extending in a crossing direction with respect to the second top clamp, a second aerobar movably secured to the second clamp and oriented forward of the pair of grips, a second arm pad clamp secured to the second aerobar rearward of the second clamp, and a second arm pad adjustably secured to the second arm pad clamp.

17. The bicycle of claim 16, wherein the at least one shim stack and the second shim stack each comprise a plurality of shims selectively engageable with the handlebar assembly for adjusting a relative height of the aerobar and second aerobar and the first arm pad and second arm pad with respect to the horizontal bar.

18. The bicycle of claim 13, wherein the horizontal bar has an airfoil shape in a vertical plane along a majority of a longitudinal length of the horizontal bar.

19. The bicycle of claim 13, wherein the at least one shim of the at least one shim stack has an airfoil shaped cross-section relative to a horizontal plane.

20. The bicycle of claim 13, wherein the at least one shim stack includes a second shim, a third shim, and a fourth shim, and wherein each of the second, third, and fourth shims has a generally similar cross-sectional shape and wherein a longitudinal length of the at least one shim and the length of at least one of the second, third, and fourth shims are dissimilar.

* * * * *